(No Model.)

L. I. BODENHAMER.
PLOW.

No. 277,205. Patented May 8, 1883.

Witnesses:
A. E. Eader
John E. Morris

Inventor:
Levi I. Bodenhamer
By his Atty
Chas B. Mann

UNITED STATES PATENT OFFICE.

LEVI I. BODENHAMER, OF KERNERSVILLE, NORTH CAROLINA.

PLOW.

SPECIFICATION forming part of Letters Patent No. 277,205, dated May 8, 1883.

Application filed May 23, 1882. (No model.)

*To all whom it may concern:*

Be it known that I, LEVI I. BODENHAMER, a citizen of the United States, residing at Kernersville, in the county of Forsyth and State of North Carolina, have invented certain new and useful Improvements in Plows, of which the following is a specification, reference being had therein to the accompanying drawings.

My invention relates to certain improvements in plows for planting and cultivating corn; and it consists in certain features of construction and combinations of parts, hereinafter first described, and then set forth in the claims.

Figure 1:
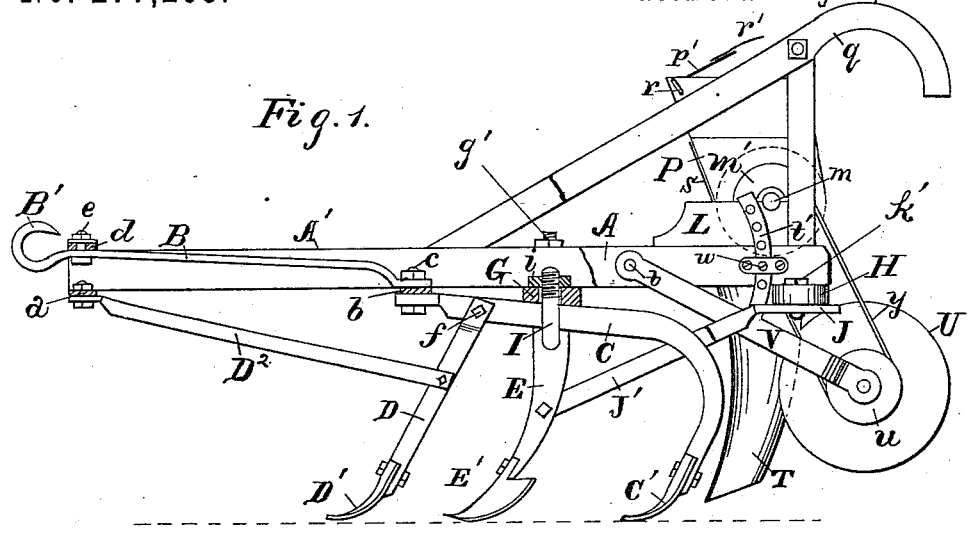
Figure 2:
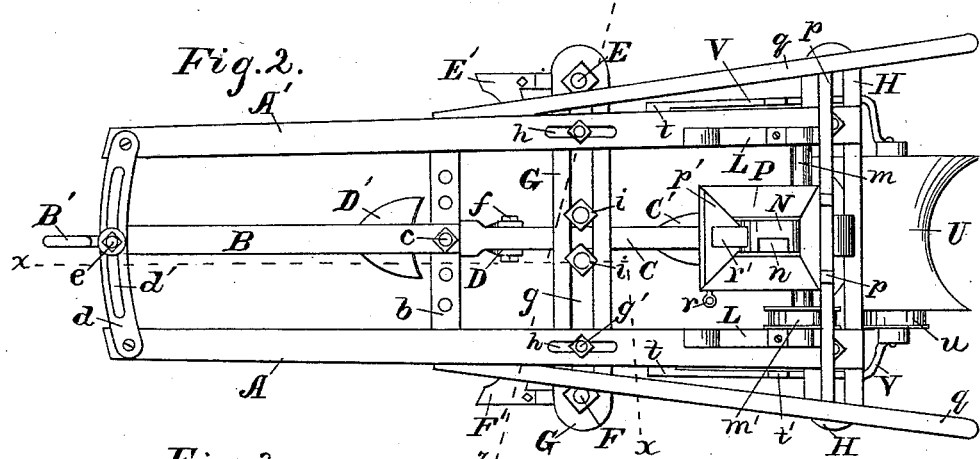
Figure 3:
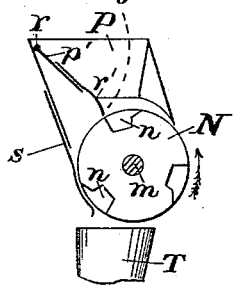
Figure 5:
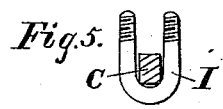
Figure 6:
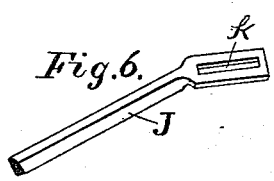
Figure 4:
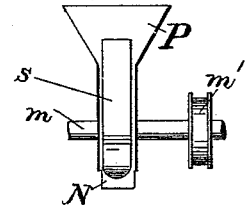

In the drawings hereto annexed, Figure 1 is a view showing a side elevation of the rear parts and a vertical section on the line $xx$, Fig. 2, of the front parts. Fig. 2 is a top view of the plow. Figs. 3 and 4 are vertical section and front end views, respectively, of the corn-dropper. Fig. 5 is a view of the U-shaped clamp. Fig. 6 is a view of the pushing-brace J.

The various parts are connected to a frame composed of the two parallel beams, A A', a front cross-bar, $a$, which connects the two beams by attachment to their under side, and another cross-bar, $b$, about midway between the ends of the beams. One end of the draft-bar B is pivoted at $c$ to the cross-bar $b$, and its front end is provided with a hook, B'. A cross-bar, $d$, is attached to the front ends of the two beams at their upper side, and lengthwise of said bar is a segment-shaped slot, $d'$, through which a set-screw bolt, $e$, attached to the draft-bar, passes. This permits a side sweep to the hook of the draft-bar, and thus it may be adjusted laterally at any point between the beams. The curved standard C of the rear opener-plow, C', has its front end pivoted to the cross-bar $b$, and the front standard, D, of the lead-plow D' is attached at $f$ to the curved standard. A draw-brace, D², has one end attached to the front cross-bar, $a$, and the other end to the front standard. The standards E and F of the right and left side turn shovel-plows E' and F' are secured, each by its upper end, in the slotted movable bar G, which extends across at the under side of the two beams. This bar has a straight slot, $g$, extending from end to end, and it is secured to the beams by a bolt, $g'$, passed through its slot $g$ at each end, and through a slot, $h$, extending lengthwise in each beam. The slots in the beams and that in the cross-bar extend crosswise with respect to each other. This permits the said bar which carries the right and left plows to be moved endwise, whereby the said plows may be shifted in the right or left direction, and also either plow may be separately shifted; and, again, either end of the said bar may be moved forward or backward, as shown by the broken lines $zz$ in Fig. 2, which is an important provision, as thereby one or the other of said side plows may take position forward or backward, and thus in trashy land the liability of choking which is occasioned by two plows being placed on a line straight across the beam is obviated. The rear curved standard, C, is secured from side movement by a U-shaped clamp, I, made of round bar-iron. The standard rests between the two prongs of the clamp, and the ends of the said two prongs, which are screw-threaded, project up through the slot $g$ in the cross-bar, and are secured by nuts $i$. This clamp is adapted to allow the cross-bar to be shifted to suit any change of position of the right and left side plows, and also permits the rear plow-beam to be moved to the right or left when cultivating. At the rear end of the beams is another slotted bar, H, which may be moved endwise, so that one end may extend more or less beyond the outer side of either beam. A pushing-brace (denoted as J on the left and J' on the right side) has one end attached to one of the side standards, and the other end, which has a slot, $k$, is attached to the slotted bar at the rear by a bolt, $k'$. The slot $k$ (shown in Fig. 6) permits adjustment of the brace to suit any forward or backward change of position of the side plows. Upon the rear end of each beam is a bearing, L, which supports a revolving shaft, $m$, on which is mounted a drop-wheel, N, turning in a vertical plane. This drop-wheel has peripheral gains $n$, which carry the grain to the funnel or drill-tube T at intervals; thereby the grain is dropped intermittently. Above the drop-wheel, and surrounding its top part on all sides, is a hopper, P, which is supported by a bar, $p$, resting on the two handles $q$. The four sides of the hopper are sloping in the usual form. Within the front side of the hopper is a supplemental side, $p'$, having its upper edge hinged on a cross-rod, r, to the hopper. The end of the cross-rod projects from the side of the hopper, and said projecting end serves as a handle by which to turn the supplemental side p' up, as shown in Fig. 1. A flat plate-spring, r', is attached to the lower edge of the supplemental side and rests upon the delivery side of the drop-wheel. This plate-spring serves as a scraper to prevent the passage of any grain in excess of that contained in the gains on the drop-wheel. The spring plate-scraper may be raised, as shown in Fig. 1, by turning the cross-rod r, and thereby relieve the drop-wheel whenever it gets choked up. A second flat plate-spring, s, (see Fig. 3,) is attached upon the outer front side of the hopper and depends below in front of the drop-wheel. This spring confines the grain to the wheel, and will prevent the stoppage of the latter, if a lump of any substance should be carried down, in which event the spring will yield and allow the obstructing substance to pass. The drill-tube T is suspended below the drop-wheel, and its lower end is directly back of the rear opener-plow, C', whereby as the grain drops intermittently it reaches the open furrow. A large grooved roller, U, follows in the rear of the drill-tube and serves to cover the grain in the furrow. The roller is attached by an arm, V, at each end, said arms being pivoted at t to the beams. A segment-shaped bar, t', is attached to each arm, the curve of the bar being concentric with the pivot t. This bar is provided with adjusting-holes, and the covering-roller may be raised or lowered to any desired height by inserting a pin or screw, w, through one of the holes into the beam. This arrangement enables the roller to give a heavy or light pressure, according to the condition of the land when planting. The roller is provided at one end with a drive-pulley, u, and a driven pulley, m', is mounted on the drop-wheel shaft m. A belt, y, connects the pulleys. Thus the drop-wheel is operated by the covering-roller.

My plow, constructed as above described, is adapted to do all the work of planting corn, laying the row, ridging up, opening the furrow, dropping the corn at intervals, and covering it. After the crop is planted the covering-roller, drop-wheel, and hopper may be removed, and the several parts of the plow may be adjusted in any desired way for cultivating or other purposes.

Having described my invention, I claim and desire to secure by Letters Patent of the United States—

1. The combination of the two beams, each provided with a slot, h, extending lengthwise, a slotted cross-bar, G, bolts g' through the slots to connect these parts, and a plow secured to each end of the slotted cross-bar, as set forth.

2. The combination of the two beams, each provided with a slot, h, extending lengthwise, a slotted cross-bar, G, bolts g' through the slots to connect these parts, a plow at each side, a rear plow having a curved standard, C, extending forward, and a U-shaped clamp having its two ends in the slot of the cross-bar to hold the curved standard, as set forth.

3. In a plow for planting, the combination, with the grain-dropping wheel and hopper, of a cross-rod, r, having an end projecting from the outer side of the hopper, and a flat plate-scraper, r', connected to the cross-rod upon the inside of the hopper, whereby the said scraper may be turned up by grasping the projecting end of the cross-rod, as set forth.

In testimony whereof I affix my signature in presence of two witnesses.

LEVI ISAAC BODENHAMER.

Witnesses:
JOHN S. RAY,
E. J. LINVILLE.